(12) United States Patent
Matsubara et al.

(10) Patent No.: US 10,520,155 B2
(45) Date of Patent: Dec. 31, 2019

(54) LIGHT GUIDE AND VEHICLE LAMP

(71) Applicant: KOITO MANUFACTURING CO., LTD., Tokyo (JP)

(72) Inventors: Eiji Matsubara, Shizuoka (JP); Mamoru Kosuge, Shizuoka (JP); Akinori Yamamoto, Shizuoka (JP); Asami Sakashita, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 16/053,830

(22) Filed: Aug. 3, 2018

(65) Prior Publication Data

US 2019/0049086 A1 Feb. 14, 2019

(30) Foreign Application Priority Data

Aug. 9, 2017 (JP) ................................. 2017-154610

(51) Int. Cl.
*F21S 41/24* (2018.01)
*F21S 41/32* (2018.01)
*F21V 8/00* (2006.01)

(52) U.S. Cl.
CPC ............. *F21S 41/24* (2018.01); *F21S 41/32* (2018.01); *G02B 6/0073* (2013.01); *G02B 6/0095* (2013.01); *B60Q 2400/20* (2013.01)

(58) Field of Classification Search
CPC ...... B60Q 2400/20; F21S 41/24; F21S 41/32; G02B 6/0073; G02B 6/0095; G02B 6/0041
See application file for complete search history.

(56) References Cited

U.S. PATENT DOCUMENTS

| 5,668,913 | A  | * | 9/1997 | Tai | ........................ | F21S 48/215 |
| 7,263,268 | B2 | * | 8/2007 | Inditsky | ............... | 362/615 G02B 6/0011 |
| 7,264,389 | B2 | * | 9/2007 | Sado | ....................... | 362/623 G02B 6/002 |
| 9,296,143 | B2 | * | 3/2016 | Kashima | ............ | 362/615 B29C 45/0055 |
| 9,316,376 | B2 | * | 4/2016 | Orisich | .................... | B60Q 1/34 |
| 10,234,615 | B2 | * | 3/2019 | Osaka | .................... | F21S 43/239 |
| 10,241,254 | B2 | * | 3/2019 | Paroni | ................... | G02B 6/0036 |

FOREIGN PATENT DOCUMENTS

JP          2014116142 A        6/2014

* cited by examiner

*Primary Examiner* — Peggy A Neils
(74) *Attorney, Agent, or Firm* — Buchanan Ingersoll & Rooney PC

(57) ABSTRACT

A light guide for a vehicle lamp includes a rod-shaped portion and a plate-shaped portion. The rod-shaped portion includes a rod-shaped light guide portion and a connecting projection portion projecting from a peripheral surface of the rod-shaped light guide portion and extending along the rod-shaped light guide portion. The plate-shaped portion includes two principal surfaces facing opposite to each other and a plate-shaped portion side surface connecting the two principal surfaces. The light guide is a multi-color molded product in which the rod-shaped portion is formed of a first resin material and the plate-shaped portion is formed of a second resin material containing a light diffusing agent. The rod-shaped light guide portion is connected to the side surface of the plate-shaped portion by the connecting projection portion.

19 Claims, 10 Drawing Sheets

LIGHT GUIDE AND VEHICLE LAMP

BACKGROUND OF THE INVENTION

1. Field of the Invention

The present invention relates to light guides suitable for use in lamps, such as vehicle lamps. The present invention further relates to vehicle lamps for use, for example, in vehicles, such as automobiles.

2. Description of the Related Art

To date, there is known a vehicle lamp that emits light from a light source toward the front of the lamp via a light guide. For example, JP2014-116142 discloses a vehicle lamp having the following structure. Specifically, light is made to enter a plate-shaped light guide through a side surface thereof, the light is then reflected by a reflective element, such as a step, provided in a principal surface on an inner side of the lamp, and the light is emitted to the front of the lamp through another principal surface on an outer side of the lamp.

With the structure that causes light to be emitted from a light guide by a reflective element, such as a step, uniform surface emission from the light guide is difficult to achieve.

SUMMARY OF THE INVENTION

The present invention has been made in view of the above and is directed to providing a technique for improving emission uniformity of a surface of a light guide.

To solve the foregoing problem, a light guide according to an aspect of the present invention includes a rod-shaped portion and a plate-shaped portion. The rod-shaped portion includes a rod-shaped light guide portion and a connecting projection portion projecting from a peripheral surface of the rod-shaped light guide portion and extending along the rod-shaped light guide portion. The plate-shaped portion includes two principal surfaces facing opposite to each other and a plate-shaped portion side surface connecting the two principal surfaces. The light guide is a multi-color molded product in which the rod-shaped portion is formed of a first resin material and the plate-shaped portion is formed of a second resin material containing a light diffusing agent. The light guide portion is connected to the plate-shaped portion side surface by the connecting projection portion. According to this aspect, emission uniformity of a surface of the light guide can be improved.

In one embodiment, the connecting projection portion may include a bonding surface bonded to the plate-shaped portion side surface. In one embodiment, the connecting projection portion may include two projection portion side surfaces disposed at respective sides of the bonding surface and connecting the bonding surface to the peripheral surface of the rod-shaped light guide portion. In one embodiment, one of the two projection portion side surfaces may be flush with one of the two principal surfaces of the plate-shaped portion. In one embodiment, the two projection portion side surfaces may be flush with the respective principal surfaces of the plate-shaped portion. In one embodiment, the bonding surface may be inclined relative to the projection portion side surfaces. In one embodiment, the plate-shaped portion may have a base thickness greater than a width of the bonding surface, the width being a distance between the two projection portion side surfaces, and the connecting projection portion and a portion of the peripheral surface of the rod-shaped light guide portion may be bonded to the plate-shaped portion side surface.

In one embodiment, at least one of the two projection portion side surfaces may be tangent to the peripheral surface of the rod-shaped light guide portion. In one embodiment, one of the two projection portion side surfaces may be tangent to the peripheral surface of the rod-shaped light guide portion, and the bonding surface may form an obtuse angle with the one of the projection portion side surfaces that is tangent to the peripheral surface of the rod-shaped light guide portion and form an acute angle with the other one of the projection portion side surfaces.

In one embodiment, a width of the bonding surface may be greater than a base thickness of the plate-shaped portion, the width being a distance between the two projection portion side surfaces. In one embodiment, at least one of the projection portion side surfaces may include a shelf portion bonded to the plate-shaped portion side surface. In one embodiment, another shelf portion may be provided on the plate-shaped portion side surface.

In one embodiment, the connecting projection portion may partially project into the plate-shaped portion side surface. In one embodiment, the connecting projection portion may include a bonding surface bonded to the plate-shaped portion side surface, the bonding surface may include a step, and the plate-shaped portion side surface may include a step that engages with the step in the bonding surface.

In one embodiment, the rod-shaped light guide portion and the connecting projection portion may be an integrally molded piece. In one embodiment, the rod-shaped light guide portion may be curved. In one embodiment, the first resin material and the second resin material may have a common optical property. In one embodiment, the light guide may include neither an optical step nor a reflective element.

An aspect of the present invention provides a vehicle lamp. The vehicle lamp may include the light guide according to any one of the foregoing aspects and a light source. The light source may be configured to emit light, and the light may enter the rod-shaped light guide portion through a light-incident surface of the rod-shaped light guide portion, enter the plate-shaped portion from the rod-shaped light guide portion through the connecting projection portion, and be emitted through the principal surfaces of the plate-shaped portion by the light diffusing agent.

DETAILED DESCRIPTION OF THE INVENTION

Figure 1:
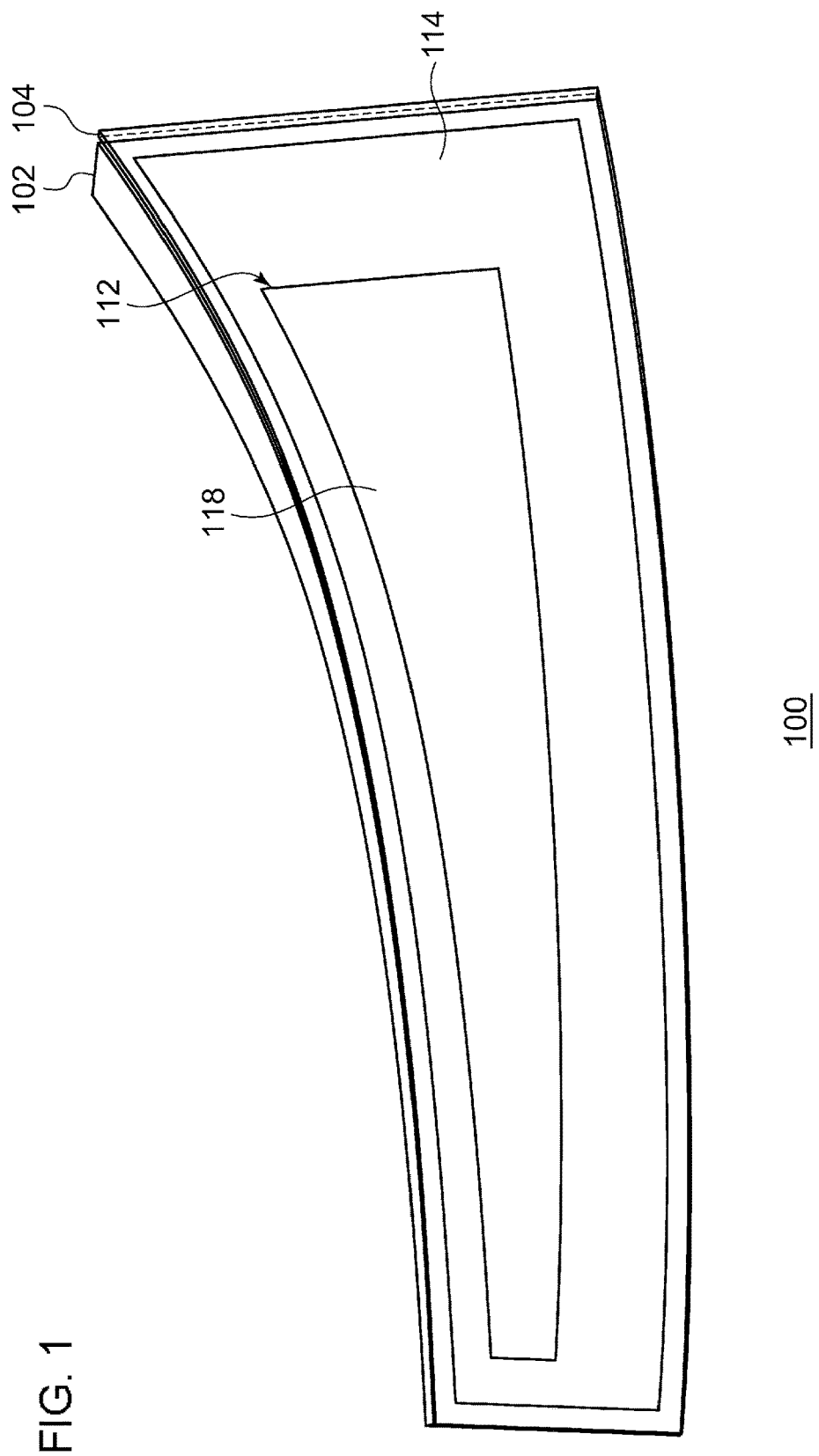
FIG. 1 is a front view of a vehicle lamp according to an embodiment.

The invention will now be described by reference to the preferred embodiments. This does not intend to limit the scope of the present invention, but to exemplify the invention.

Hereinafter, the present invention will be described on the basis of exemplary embodiments with reference to the drawings. The embodiments are illustrative in nature and are not intended to limit the invention. Not all the features described in the embodiments and combinations thereof are necessarily essential to the invention. Identical or equivalent constituent elements, members, and processes illustrated in the drawings are given identical reference characters, and duplicate descriptions thereof will be omitted as appropriate. The scales and the shapes of the components illustrated in the drawings are set merely for convenience to facilitate the descriptions and are not to be interpreted as limiting the invention, unless specifically indicated otherwise. Terms such as "first" and "second" used in the present specification and in the claims do not indicate the order or the importance in any way and are merely for distinguishing between a given configuration and another configuration.

Figure 2:
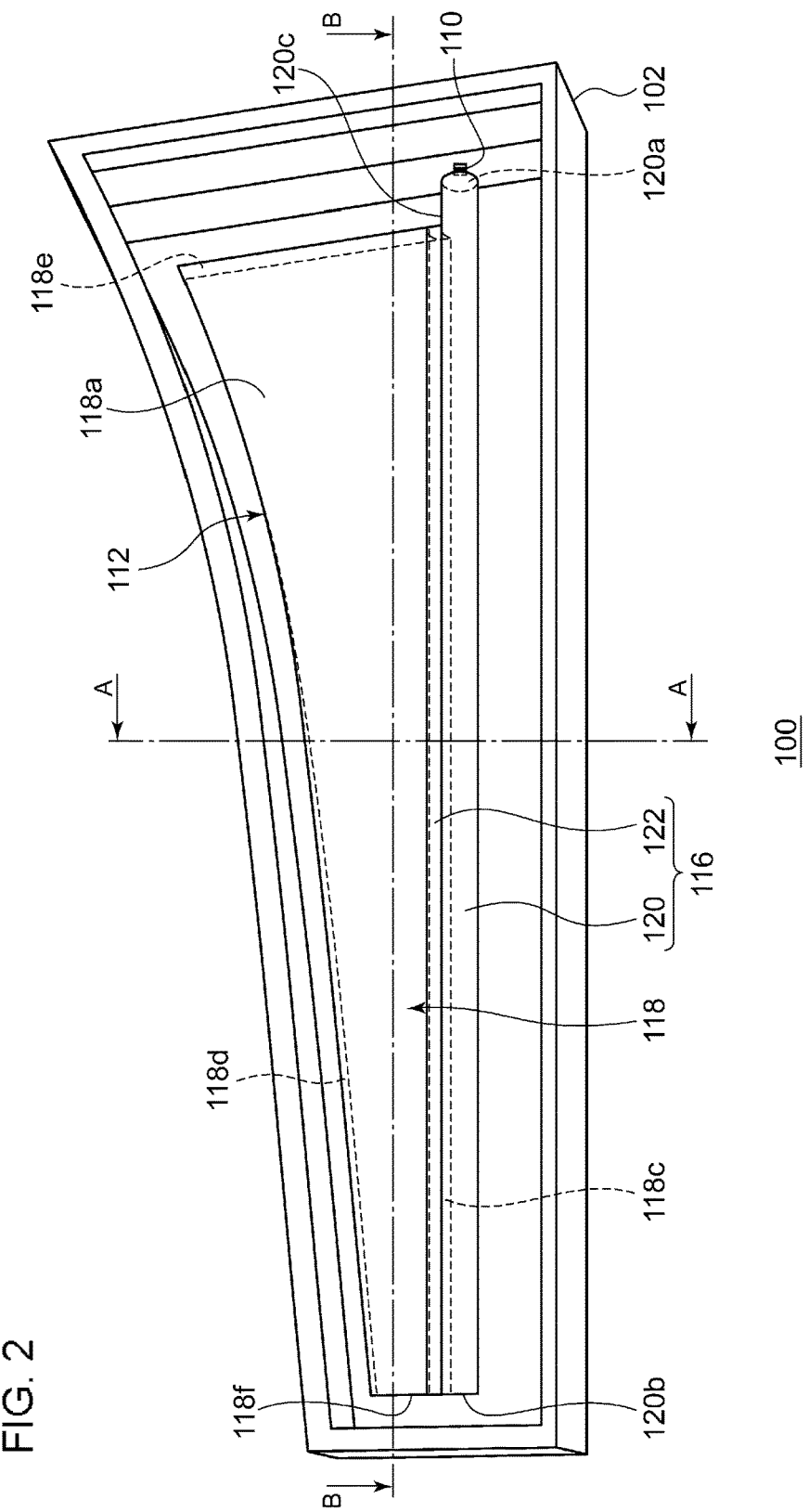
FIG. 2 is a front view illustrating an inner structure of a vehicle lamp according to an embodiment.
Figure 3A:
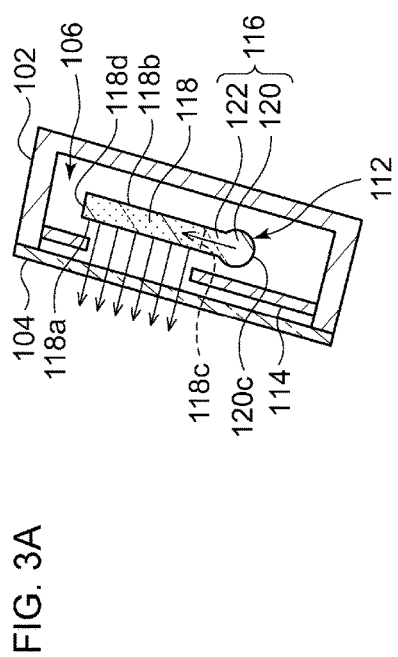
FIG. 3A is a sectional view taken along the A-A line indicated in FIG. 2.
Figure 3B:
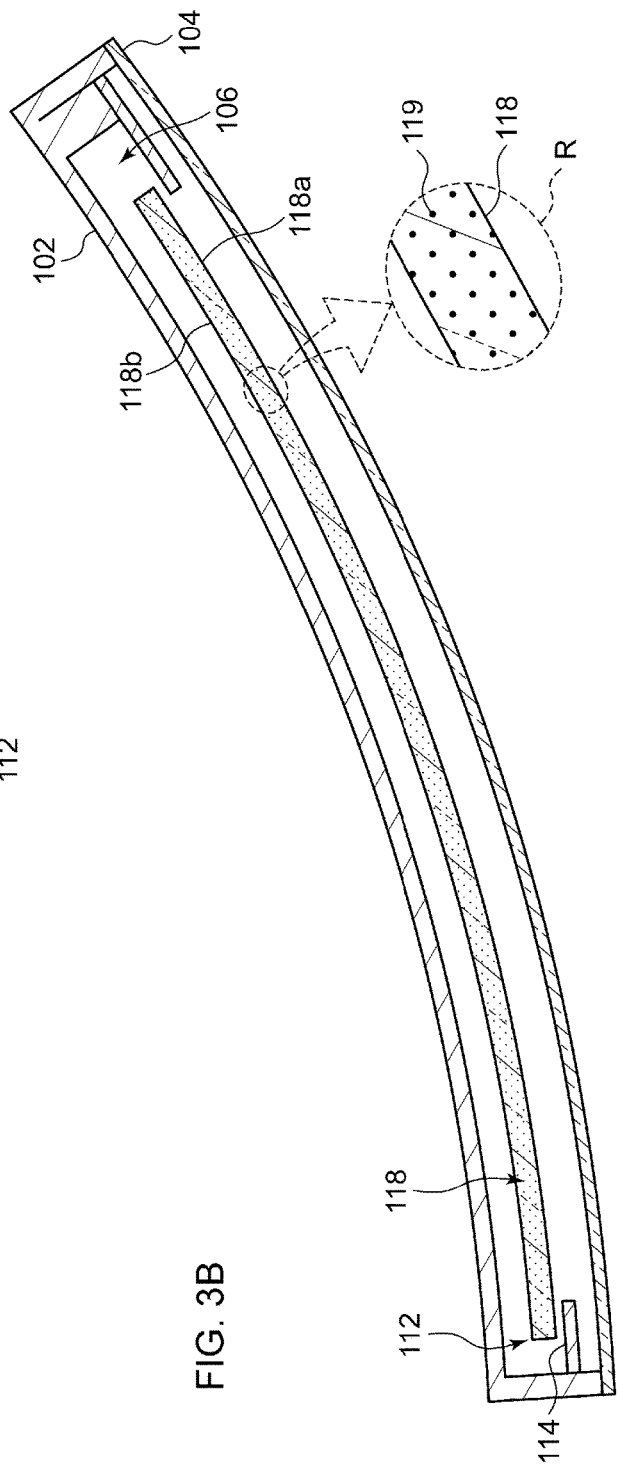
FIG. 3B is a sectional view taken along the B-B line indicated in FIG. 2.
Figure 4A:
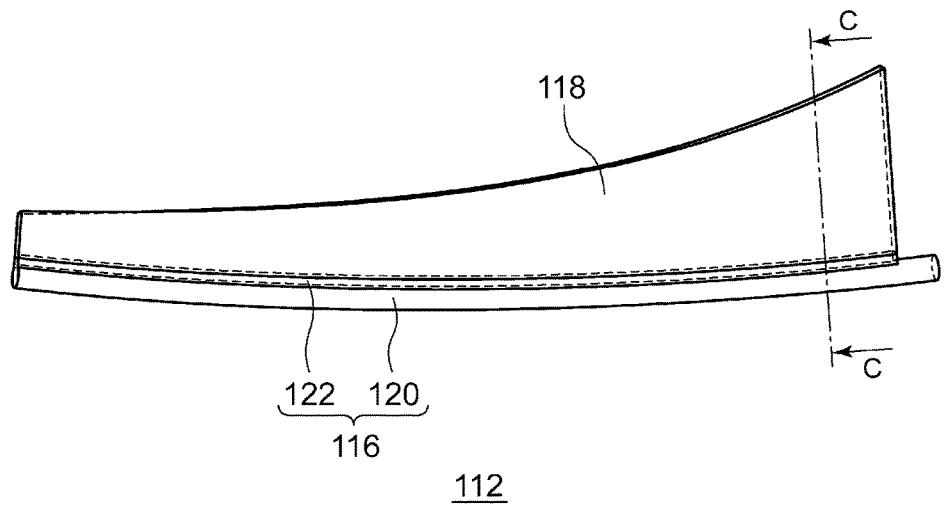
FIG. 4A is a front view of a light guide according to an embodiment.
Figure 4B:
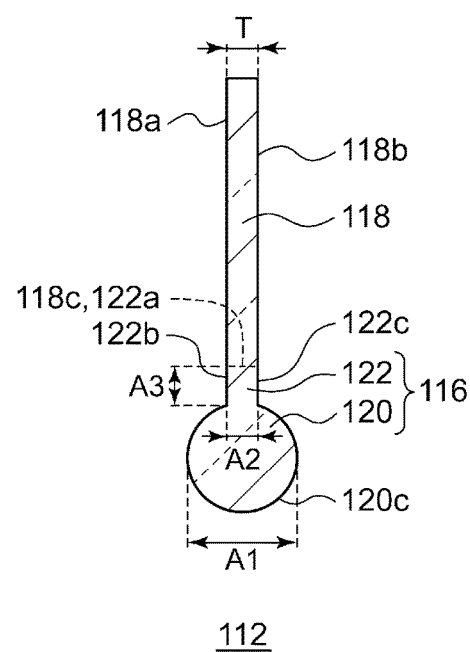
FIG. 4B is a sectional view taken along the C-C line indicated in FIG. 4A.
Figure 5:
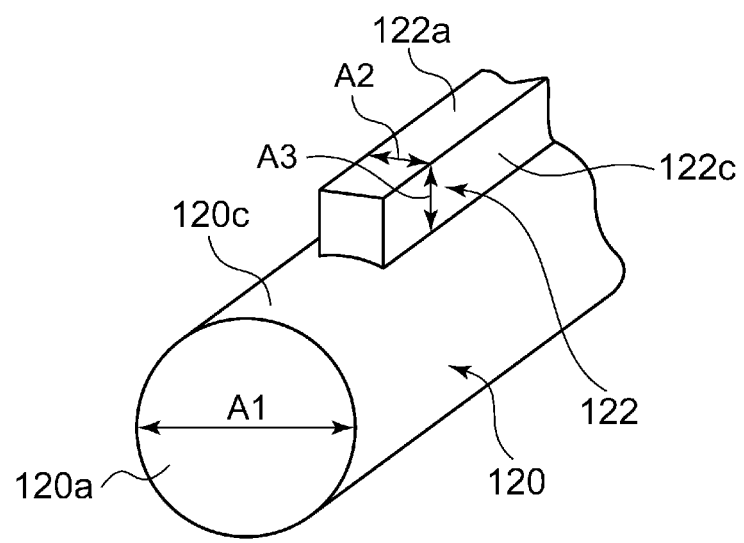
FIG. 5 is an enlarged schematic perspective view of an end portion of a rod-shaped portion provided in a light guide according to an embodiment.

FIG. 1 is a front view of a vehicle lamp according to an embodiment. FIG. 2 is a front view illustrating an inner structure of a vehicle lamp according to an embodiment. FIG. 3A is a sectional view taken along the A-A line indicated in FIG. 2. FIG. 3B is a sectional view taken along the B-B line indicated in FIG. 2. FIG. 4A is a front view of a light guide according to an embodiment. FIG. 4B is a sectional view taken along the C-C line indicated in FIG. 4A. FIG. 5 is an enlarged schematic perspective view of an end portion of a rod-shaped portion provided in a light guide according to an embodiment.

A vehicle lamp 100 according to the present embodiment is, for example, a rear combination lamp disposed in a rear portion of a vehicle. The vehicle lamp 100 includes a lamp body 102 having an opening and a light-transmissive outer cover 104 that covers the opening in the lamp body 102. The lamp body 102 and the outer cover 104 form a lamp room 106, and a light source 110, a light guide 112, and a shielding member 114 are housed in the lamp room 106. The light source 110, the light guide 112, and the shielding member 114 are each fixed to the lamp body 102. FIG. 2 illustrates the vehicle lamp 100 with the outer cover 104 and the shielding member 114 removed therefrom.

The light source 110 is a light-emitting diode (LED), for example. Alternatively, the light source may be a laser diode (LD), another semiconductor light-emitting element such as an organic or inorganic electroluminescent (EL) element, an incandescent lamp, a halogen lamp, a discharge lamp, or the like.

The light guide 112 includes a rod-shaped portion 116 and a plate-shaped portion 118. The rod-shaped portion 116 is provided to serve as a light pipe for guiding light from the light source 110 to the plate-shaped portion 118. The rod-shaped portion 116 extends along at least one side edge portion of the plate-shaped portion 118. The rod-shaped portion 116 includes a rod-shaped light guide portion 120 and a connecting projection portion 122. The rod-shaped light guide portion 120 and the connecting projection portion 122 are an integrally molded piece. The plate-shaped portion 118 is provided to serve as an emission portion that allows the light guided by the rod-shaped portion 116 to be emitted outside the light guide 112. The plate-shaped portion 118 has a shape narrowly elongated in the direction in which the rod-shaped portion 116 extends.

The plate-shaped portion 118 has two principal surfaces 118a and 118b facing opposite to each other. The principal surface 118a is located to face the frontward the lamp, and the principal surface 118b is located to face the rearward of the lamp. The plate-shaped portion 118 further has a plurality of side surfaces connecting the two principal surfaces 118a and 118b. The plate-shaped portion 118 according to the present embodiment has a substantially rectangular shape elongated in the direction in which the rod-shaped portion 116 extends and includes four side surfaces 118c, 118d, 118e, and 118f.

The side surface 118c and the side surface 118d extend in the direction in which the rod-shaped portion 116 extends, or in other words, extend in the widthwise direction of the vehicle. The side surface 118c is located lower than the side surface 118d in the vertical direction. The side surface 118c extends parallel to the direction in which the rod-shaped portion 116 extends. The side surface 118d is curved to gradually approach the side surface 118c from the outer side in the widthwise direction of the vehicle toward the inner side in the widthwise direction of the vehicle. The side surface 118e and the side surface 118f extend in the direction substantially orthogonal to the direction in which the rod-shaped portion 116 extends. The side surface 118e connects the side surface 118c and the side surface 118d at their outer end portions in the widthwise direction of the vehicle, and the side surface 118f connects the side surface 118c and the side surface 118d at their inner end portions in the widthwise direction of the vehicle.

The rod-shaped light guide portion 120 is a long member extending in a given direction and is a light guide having a round rod shape. The rod-shaped light guide portion 120 according to the present embodiment has a columnar shape and extends in the widthwise direction of the vehicle. The rod-shaped light guide portion 120 has one end portion 120a (or an end surface) located outward in the widthwise direction of the vehicle, another end portion 120b (or an end surface) located inward in the widthwise direction of the vehicle, and a peripheral surface 120c connecting the two end portions 120a and 120b. In one example, the rod-shaped light guide portion 120 extends in a gentle curve, but this is not a limiting example, and the rod-shaped light guide portion 120 may extend linearly. Alternatively, the rod-shaped light guide portion 120 may include a linear portion and a curved portion that are connected to each other along the direction in which the rod-shaped light guide portion 120 extends. In one embodiment, the rod-shaped light guide portion 120 may have an elliptic columnar shape.

The connecting projection portion 122 projects from the peripheral surface 120c of the rod-shaped light guide portion 120 and extends along the rod-shaped light guide portion 120. The connecting projection portion 122 projects from the peripheral surface 120c in the radial direction of the rod-shaped light guide portion 120. In the present embodiment, the rod-shaped portion 116 is located underneath the plate-shaped portion 118 in the vertical direction, and the connecting projection portion 122 projects from the rod-shaped light guide portion 120 upward in the vertical direction. The connecting projection portion 122 is a linear projection portion extending in the direction in which the rod-shaped light guide portion 120 extends and is formed on the peripheral surface 120c to extend substantially the entire length of the rod-shaped light guide portion 120. In one example, the connecting projection portion 122 is provided at the end portion 120b of the rod-shaped light guide portion 120 but not at the end portion 120a of the rod-shaped light guide portion 120. In the light guide 112, the rod-shaped light guide portion 120 is connected to the side surface 118c of the plate-shaped portion 118 by the connecting projection portion 122.

The connecting projection portion 122 has a bonding surface 122a and two projection portion side surfaces 122b and 122c. The bonding surface 122a is bonded to the side surface 118c of the plate-shaped portion 118. The bonding surface 122a corresponds to an upper surface of the connecting projection portion 122 that connects the two projection portion side surfaces 122b and 122c. The projection portion side surfaces 122b and 122c are disposed at respective sides of the bonding surface 122a and connect the bonding surface 122a to the peripheral surface 120c of the rod-shaped light guide portion 120. The two projection portion side surfaces 122b and 122c face opposite to each other. The bonding surface 122a is orthogonally connected to the projection portion side surfaces 122b and 122c.

In a state in which the connecting projection portion 122 is bonded to the plate-shaped portion 118, the projection portion side surfaces 122b and 122c connect the peripheral surface 120c of the rod-shaped light guide portion 120 to the principal surfaces 118a and 118b of the plate-shaped portion 118. The two projection portion side surfaces 122b and 122c are flush with the respective principal surfaces 118a and 118b of the plate-shaped portion 118. In other words, the projection portion side surfaces 122b and 122c are flush with the respective adjacent principal surfaces 118a and 118b of the plate-shaped portion 118. As illustrated in FIG. 4B, when seen along a section orthogonal to the direction in which the rod-shaped portion 116 extends, the projection portion side surfaces 122b and 122c form straight lines with the respective adjacent principal surfaces 118a and 118b of the plate-shaped portion 118. No step is present at a portion where the connecting projection portion 122 and the plate-shaped portion 118 are bonded to each other.

In one example, the plate-shaped portion 118 has a thickness, or a base thickness T, for example, in a range of from 1 mm to 20 mm or, for example, in a range of from 1 mm to 5 mm. Typically, the "base thickness" of a molded product refers to the thickness held most broadly in the molded product as a whole.

In one example, the rod-shaped light guide portion 120 has a diameter A1 in a range of from 3 mm to 20 mm or, for example, in a range of from 5 mm to 15 mm. The connecting projection portion 122 has a width A2 equal to the base thickness T of the plate-shaped portion 118. Thus, the width A2 is in a range of from 1 mm to 20 mm or, for example, in a range of from 1 mm to 5 mm. The width A2 of the connecting projection portion 122 corresponds to the distance between the two projection portion side surfaces 122b and 122c. The connecting projection portion 122 has a height A3 in a range of from 0.5 mm to 20 mm or, for example, in a range of from 2 mm to 10 mm. The height A3 of the connecting projection portion 122 corresponds to the projection height of the connecting projection portion 122 from the peripheral surface 120c of the rod-shaped light guide portion 120.

The base thickness T of the plate-shaped portion 118 is smaller than the diameter A1 of the rod-shaped light guide portion 120. The width A2 of the connecting projection portion 122 is smaller than the diameter A1 of the rod-shaped light guide portion 120. The height A3 of the connecting projection portion 122 is smaller than the diameter A1 of the rod-shaped light guide portion 120.

As can be seen from FIGS. 4B and 5, the section of the rod-shaped portion 116 along a plane orthogonal to its extending direction has a shape obtained by combining a circular region and a rectangular region. The circular region corresponds to the cross section of the rod-shaped light guide portion 120, and the rectangular region corresponds to the cross section of the connecting projection portion 122. The rectangular region is adjacent to and is coupled to the circular region. This cross-sectional shape is symmetric with respect to a straight line extending from the diameter of the circular region serving as an axis of symmetry.

The vehicle lamp 100 includes the shielding member 114. The shielding member 114 is a long plate-shaped member extending in the widthwise direction of the vehicle. The shielding member 114 is frame shaped and extends over the peripheral portion of the light source 110, the rod-shaped portion 116, and the plate-shaped portion 118 in a plane toward the front of the lamp. The shielding member 114 can conceal the peripheral portion of the light source 110, the rod-shaped portion 116, and the plate-shaped portion 118 from the outside of the lamp. The entire rod-shaped portion 116 is concealed by the shielding member 114. In other words, not only the rod-shaped light guide portion 120 but also the connecting projection portion 122 is disposed so as not to be visible from the outside of the lamp. The principal surfaces of the plate-shaped portion 118 are exposed through an opening of the frame constituting the shielding member 114. Accordingly, as illustrated in FIG. 1, only the plate-shaped portion 118 is visible from the outside of the lamp.

The light guide 112 is a multi-color molded product in which the rod-shaped portion 116 is formed of a first resin material and the plate-shaped portion 118 is formed of a second resin material. The first resin material and the second resin material are both light transmissive, and thus the light guide 112 as a whole is a light-transmissive resin member. The light guide 112 is manufactured as an integrally molded piece through a well-known double-color molding process, for example. The light guide 112 can also be manufactured through a multi-component double-color molding process in which the rod-shaped portion 116 serves as a primary molded product and the plate-shaped portion 118 serves as a secondary molded product. Alternatively, the plate-shaped portion 118 may serve as a primary molded product, and the rod-shaped portion 116 may serve as a secondary molded product. The light guide 112 can also be manufactured through an insert molding process in which the rod-shaped portion 116 (or the plate-shaped portion 118) serves as a resin insert product.

The first resin material for forming the rod-shaped portion 116 (i.e., the rod-shaped light guide portion 120 and the connecting projection portion 122) is a transparent resin material containing no light diffusing agent 119, and the second resin material for forming the plate-shaped portion 118 is a transparent resin material containing a light diffusing agent 119. The transparent resin material is, for example, a transparent thermoplastic resin or thermosetting resin, such as polycarbonate resin or acrylic resin. Typically, the transparent resin material composing the first resin material and the transparent resin material composing the second resin material are the same material but may be different from each other. In a case in which the two transparent resin materials are different from each other, the two transparent resin materials preferably have a common optical property (e.g., refractive index) in order to achieve high light propagation from the rod-shaped portion 116 to the plate-shaped portion 118. The light diffusing agent 119 is mixed uniformly in the transparent resin material. The first resin material may contain the light diffusing agent 119 at a concentration lower than that in the second resin material.

As illustrated in an enlarged view of a dashed-line region R in FIG. 3B, the plate-shaped portion 118 contains the light diffusing agent 119. Examples of the light diffusing agent 119 include a metal oxide particle, such as a titanium dioxide particle. The mean particle size of the titanium dioxide particle is, for example, from 150 nm to 500 nm, preferably from 160 nm to 450 nm, more preferably from 170 nm to 450 nm, even more preferably from 200 nm to 400 nm, and particularly preferably from 220 nm to 400 nm. The content of the light diffusing agent 119 is, for example, from 0.1 mass ppm to 100 mass ppm with respect to the total mass of the plate-shaped portion 118, preferably from 0.1 mass ppm to 50 mass ppm, and more preferably from 0.1 mass ppm to 10 mass ppm. The proportion of rutile transformation in the titanium dioxide particle is, for example, no less than 50 mass %, preferably no less than 60 mass %, more preferably no less than 70 mass %, and even more preferably no less than 90 mass %. The plate-shaped portion 118 may contain another monomer that can be copolymerized with a primary monomer of a resin used therein or a typical additive, such as an antistatic agent, an antioxidant, a release agent, a flame retardant, a lubricant, a flow improver, a filler, or a light stabilizer.

When the haze value is measured with the plate thickness set to 4 mm, the plate-shaped portion 118, in at least a portion thereof, has a haze value in the plate-thickness direction of more than 7% but no more than 30%. When the haze value is measured under the same condition, the rod-shaped portion 116 has a haze value of no more than 7%. When the visible light transmittance is measured with the plate thickness set to 4 mm, the plate-shaped portion 118, in at least a portion thereof, has a visible light transmittance in the plate-thickness direction of no less than 60% nor more than 92%. The visible light transmittance in the plate-thickness direction is the proportion of the quantity of light emitted in all directions through the principal surface 118a with respect to the quantity of light that enters the plate-shaped portion 118 through the principal surface 118b in the direction normal to the principal surface 118b. The haze values of the plate-shaped portion 118 and the rod-shaped portion 116 can be measured with the use of the haze meter HZ-2 (manufactured by Suga Test Instruments Co., Ltd.) in accordance with JIS K7136. The visible light transmittance of the plate-shaped portion 118 can be measured with the use of the haze meter HZ-2 (manufactured by Suga Test Instruments Co., Ltd.) in accordance with JIS K7361-1.

Figure 6A:
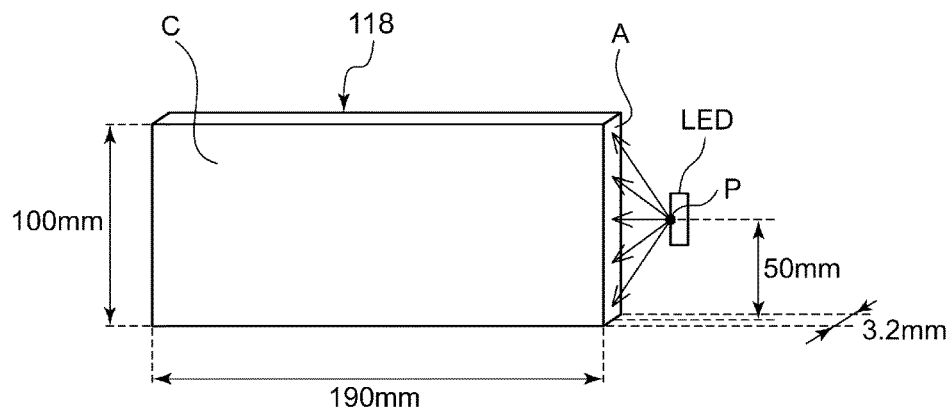
FIGS. 6A and 6B are schematic diagrams for describing a method of measuring light emission efficiency of a plate-shaped portion.
Figure 6B:
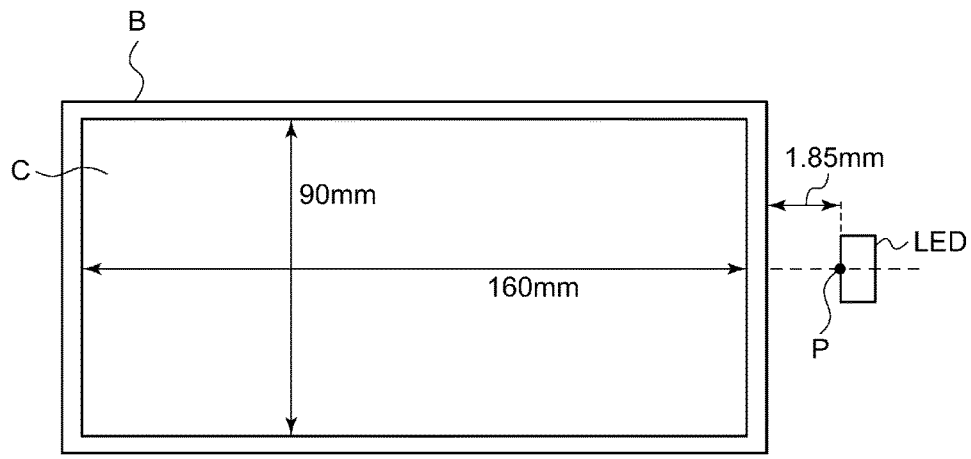

The plate-shaped portion 118 satisfies the following conditions with regard to the emission efficiency obtained when light entering through the side surfaces 118c to 118f is emitted through the principal surface 118a. FIGS. 6A and 6B are schematic diagrams for describing a method of measuring the light emission efficiency of the plate-shaped portion. FIG. 6A illustrates the dimensions of the plate-shaped portion 118 and the arrangement of an LED. FIG. 6B illustrates the plate-shaped portion 118 to which a fixing frame B is attached, as viewed from a side C of a light-exit surface.

As illustrated in FIG. 6A, a rectangular parallelepiped plate-shaped portion 118 having a dimension of 100 mm in the up-down direction, a dimension of 190 mm in the right-left direction, and a thickness of 3.2 mm is prepared. A side surface A of this plate-shaped portion 118 serves as an incident surface of source light. The LED is disposed in a direction normal to the side surface A. The LED is disposed such that a focal point P faces the side surface A and the focal point A is at a distance of 1.85 mm from the side surface A. Light is diffused from an emission surface of the LED in a 180-degree range.

As illustrated in FIG. 6B, the periphery of the prepared plate-shaped portion 118 is covered by the fixing frame B. In a state in which the plate-shaped portion 118 is covered by the fixing frame B, the light-exit surface C of the plate-shaped portion 118 has a dimension of 90 mm in the up-down direction and a dimension of 160 mm in the right-left direction. Neither the front surface nor the back surface of the fixing frame B reflects light. In addition, a light-receiving surface (not illustrated) is disposed at a distance of √10 from the light-exit surface C in the direction normal to the light-exit surface C.

In this state, light is emitted from the LED. Then, the luminous flux of light applied to a rectangular region on the light-receiving surface is measured. This rectangular region is defined by upper and lower 15-degree lines and right and left 25-degree lines with respect to the center at an intersection of the light-receiving surface and the line normal to the light-exit surface C at its center. In the case of the plate-shaped portion 118, the luminous flux of the light applied to this rectangular region is no less than 0.3% with the luminous flux of the light emitted from the LED being 1.

The plate-shaped portion 118 has the following optical characteristics. Specifically, when light enters the plate-shaped portion 118 through one of the side surfaces 118c to 118f, the quantity of light emitted per unit area through the principal surface 118a is greater than the quantity of light emitted per unit area through the side surface (e.g., the side surface 118d) facing opposite to the side surface (e.g., the side surface 118c) through which the light has entered the plate-shaped portion 118. When light enters the plate-shaped portion 118 through the principal surface 118b, the quantity of light emitted per unit area through the principal surface 118a is greater than the quantity of light emitted per unit area through the side surfaces 118c to 118f. In other words, in the plate-shaped portion 118, in either cases in which light enters the plate-shaped portion 118 through the side surfaces 118c to 118f and light enters the plate-shaped portion 118 through the principal surface 118b, the proportion of light emitted through the principal surface 118a is higher than the proportion of light emitted through the side surfaces 118c to 118f.

The light source 110 is disposed such that its light-emission surface opposes the one end portion 120a of the rod-shaped light guide portion 120. The light emitted from the light source 110 enters the rod-shaped portion 116 through the end portion 120a serving as the light-incident surface of the rod-shaped light guide portion 120. The light that has entered the rod-shaped portion 116 enters the plate-shaped portion 118 from the rod-shaped light guide portion 120 through the connecting projection portion 122. To be more specific, the light from the light source 110 travels inside the rod-shaped portion 116 while undergoing internal reflection from the one end portion 120a to the other end portion 120*b* of the rod-shaped light guide portion 120. A portion of the light from the light source 110 enters the connecting projection portion 122 in the process of traveling from one end portion 120*a* to another end portion 120*b* of the rod-shaped portion 116, and this portion of light leaks to the side surface 118*c* of the plate-shaped portion 118 through the bonding surface 122*a* and enters the plate-shaped portion 118 (see FIG. 3A).

The light that has enters the plate-shaped portion 118 through the side surface 118*c* is deflected toward the principal surface 118*a* by the light diffusing agent 119 dispersed in the plate-shaped portion 118. Then, the light is emitted through the entire principal surface 118*a* of the plate-shaped portion 118. In this manner, when the light source 110 is on, the plate-shaped portion 118 appears as if the light is emitted uniformly from the entire principal surface 118*a* due to the light diffusing function of the light diffusing agent 119. Meanwhile, when the light source 110 is off, the plate-shaped portion 118 appears transparent. Alternatively, the plate-shaped portion 118 appears slightly colored (e.g., faint white color) depending on the concentration of the light diffusing agent 119.

Figure 7:
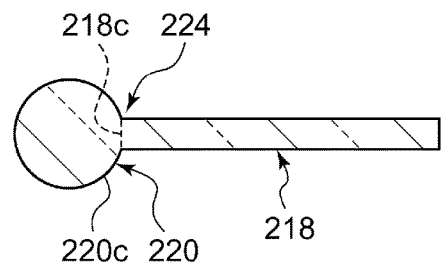
FIG. 7 illustrates a cross-sectional shape of a light guide according to a comparative example.

FIG. 7 illustrates a cross-sectional shape of a light guide 212 according to a comparative example. FIG. 7 illustrates a section of the light guide 212 along a plane orthogonal to its extending direction. The light guide 212 has a structure in which a side surface 218*c* of a plate-shaped portion 218 is directly connected to a peripheral surface 220*c* of a rod-shaped portion 220. In other words, unlike the light guide 112 according to the present embodiment, no shape corresponding to the connecting projection portion 122 is present in a bonding portion 224 in the light guide 212 according to the comparative example. It is to be noted that the light guide 212 according to the comparative example is not known to the public. The light guide 212 according to the comparative example can be manufactured through a multi-component double-color molding process in which the rod-shaped portion 220 serves as a primary molded product and the plate-shaped portion 218 serves as a secondary molded product.

Figure 8A:
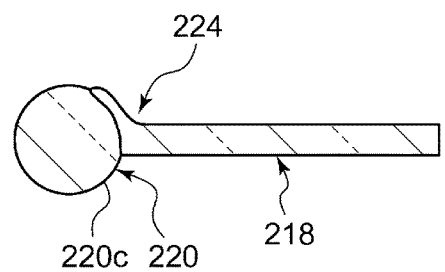
FIGS. 8A and 8B are schematic diagrams illustrating examples of problems that could arise in the process of molding a light guide according to a comparative example.
Figure 8B:
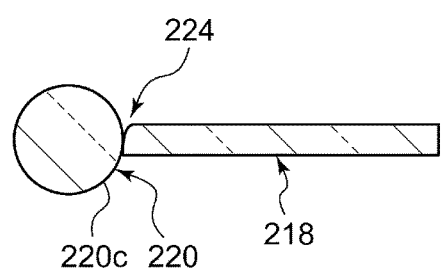

FIGS. 8A and 8B are schematic diagrams illustrating examples of problems that could arise in the process of molding the light guide 212 according to the comparative example.

FIG. 8A illustrates an overflow (i.e., also known as an overlap) of resin produced at the bonding portion 224. In a double-color molding process, a primary molded product, or the rod-shaped portion 220, is held in advance in a die for molding a secondary molded product, or the plate-shaped portion 218. The charging pressure of molten resin widens a gap between the rod-shaped portion 220 and the die when the molten resin for forming the plate-shaped portion 218 is poured into the die, and in association therewith, the molten resin may enter into the gap. The resin that has entered into the gap is solidified therein to result in an overlap. As the resin of the plate-shaped portion 218 partially covers the peripheral surface 220*c* of the rod-shaped portion 220, the cross-sectional shape of the rod-shaped portion 220 deviates from the cross-sectional shape of the design (e.g., a circular cross-sectional shape ideal for good light propagation). The light propagation loss of the rod-shaped portion 220 resulting from light leakage, light blockage, or the like increases, and this causes a decrease in the quantity of light emitted from the plate-shaped portion 218 or uneven light emission. The above may also affect the light distribution of a vehicle lamp in which the light guide 212 is mounted.

FIG. 8B illustrates a crack or peeling produced in the bonding portion 224. When an acute-angled notch is present in the bonding portion 224, a crack or peeling is likely to occur from that notch. When a crack or peeling occurs, the light propagation loss increases from the rod-shaped portion 220 to the plate-shaped portion 218, and this leads to a decrease in the quantity of light emitted from the plate-shaped portion 218 or uneven light emission.

Accordingly, it is desired that countermeasures against such problems be taken. According to the study by the present inventors, the problems such as an overlap and a crack described above that may occur in a multi-color molding process for molding the light guide 212 are conceivably attributable to the shape of the bonding portion 224, or in other words, a discontinuous shape variation between the plate-shaped portion 218 and the rod-shaped portion 220.

The light guide 112 according to the present embodiment includes the rod-shaped portion 116 and the plate-shaped portion 118. The rod-shaped portion 116 includes the rod-shaped light guide portion 120 and the connecting projection portion 122 projecting from the peripheral surface 120*c* of the rod-shaped light guide portion 120 and extending along the rod-shaped light guide portion 120. The plate-shaped portion 118 includes the two principal surfaces 118*a* and 118*b* facing opposite to each other and the side surface 118*c* connecting the principal surfaces 118*a* and 118*b*. The light guide 112 is a multi-color molded product in which the rod-shaped portion 116 is formed of the first resin material and the plate-shaped portion 118 is formed of the second resin material containing the light diffusing agent 119, and the rod-shaped light guide portion 120 is connected to the side surface 118*c* of the plate-shaped portion 118 by the connecting projection portion 122.

With the light guide 112 according to the present embodiment, the connecting projection portion 122 is interposed between the rod-shaped light guide portion 120 and the plate-shaped portion 118. The shape of each of the rod-shaped light guide portion 120 and the plate-shaped portion 118 can be designed optimally to provide desired optical characteristics. Meanwhile, the shape of the connecting projection portion 122 can be designed optimally to achieve good bonding between the rod-shaped portion 116 and the plate-shaped portion 118. In this manner, the possibility of problems such as an overlap and a crack that could arise in a multi-color molding process can be reduced. The decrease in the quantity of light emitted from the plate-shaped portion 118 or uneven light emission can be prevented or alleviated. This helps ensure the light distribution of the vehicle lamp 100 in which the light guide 112 is mounted.

The connecting projection portion 122 includes the bonding surface 122*a* bonded to the side surface 118*c* of the plate-shaped portion 118 and the two projection portion side surfaces 122*b* and 122*c* disposed at respective sides of the bonding surface 122*a* and connecting the bonding surface 122*a* to the peripheral surface 120*c* of the rod-shaped light guide portion 120. The two projection portion side surfaces 122*b* and 122*c* are flush with the respective principal surfaces 118*a* and 118*b* of the plate-shaped portion 118. In this manner, a discontinuous shape variation between the plate-shaped portion 118 and the rod-shaped portion 116 is suppressed. Accordingly, any gap between the rod-shaped portion 116 and the die is less likely to be enlarged by the pressure of molten resin in a multi-color molding process. In addition, an acute-angled notch is less likely to be produced in the bonding surface 122*a*. In this manner, the possibility of problems such as an overlap and a crack that could arise in a multi-color molding process can be reduced.

The vehicle lamp 100 according to the present embodiment includes the light source 110 and the light guide 112. The light guide 112 includes the rod-shaped portion 116 and the plate-shaped portion 118 and has a structure in which the peripheral surface 120c of the rod-shaped light guide portion 120 is connected to the side surface 118c of the plate-shaped portion 118 by the connecting projection portion 122. The plate-shaped portion 118 contains the light diffusing agent 119. Light from the light source 110 enters the rod-shaped light guide portion 120 through the light-incident surface of the rod-shaped light guide portion 120, enters the plate-shaped portion 118 from the rod-shaped light guide portion 120 through the connecting projection portion 122, and is emitted through the principal surface 118a of the plate-shaped portion 118 by the light diffusing agent 119 (see FIG. 3A).

Thus, more uniform surface emission can be achieved from the plate-shaped portion 118 of the light guide 112, as compared to a light guide in which light entering therein through a side surface is reflected by a reflective element, such as a step, provided in a principal surface on an inner side of the lamp and is emitted through another principal surface on an outer side of the lamp. In addition, the emission uniformity of the surface of the light guide can be improved, and thus a pedestrian, a driver of another vehicle, or the like can visually recognize the emission of the vehicle lamp 100 more reliably. Accordingly, the visibility of the vehicle lamp 100 can be improved. In addition, the design sophistication and the appearance of the vehicle lamp 100 can be improved.

The plate-shaped portion 118 allows light to be emitted through the principal surface 118a by the light diffusing agent 119. This renders it unnecessary to perform optical control such as an adjustment of the angle of a reflective surface, which could be required when a reflective element is used. Accordingly, the light guide 112 can be molded more simply, and the manufacturing cost can be reduced. The rod-shaped portion 116 and the plate-shaped portion 118 are an integrally molded piece. This makes it possible to increase the light propagation efficiency from the rod-shaped portion 116 to the plate-shaped portion 118. In addition, the number of components of the vehicle lamp 100 and the manufacturing cost of the vehicle lamp 100 can be reduced.

Light from the light source 110 travels inside the rod-shaped portion 116 while undergoing internal reflection from the end portion 120a to the end portion 120b of the rod-shaped light guide portion 120, and a portion of the light that leaks into the connecting projection portion 122 in the aforementioned internal reflection process enters the plate-shaped portion 118. Accordingly, the light from the light source 110 gradually enters the plate-shaped portion 118 in the process of traveling inside the rod-shaped portion 116. This makes it possible to achieve more uniform surface emission of the plate-shaped portion 118.

The plate-shaped portion 118 allows the light that has entered therein through the side surface 118c to be emitted efficiently through the principal surface 118a. Thus, the light source 110 and the rod-shaped portion 116 can be disposed in the same plane as the plate-shaped portion 118. This makes it possible to reduce the thickness of the vehicle lamp 100, as compared to a structure in which a light source is disposed behind a plate-shaped portion 118 to allow the light to be emitted from the plate-shaped portion 118.

In the present embodiment, the light guide 112 is not provided with a so-called optical step or any other reflective element. No step is formed in the peripheral surface 120c of the rod-shaped light guide portion 120, and no step is formed in the principal surfaces 118a and 118b of the plate-shaped portion 118, either. However, if necessary, the light guide 112 may include such a reflective element. For example, a reflective element, such as a metal film, a step, or a dome-shaped element, may be provided in the end portion 120b of the rod-shaped portion 116. This makes it possible to reflect the light that has reached the end portion 120b back toward the end portion 120a. Consequently, the quantity of light emitted from the plate-shaped portion 118 can be increased. Alternatively, a reflective element may be provided in the end portion 120a or the peripheral surface 120c of the rod-shaped light guide portion 120. A reflective element may be provided in the principal surface 118a or 118b or any one of the side surfaces 118c to 118f of the plate-shaped portion 118.

FIGS. 9A to 11C illustrate various other examples of the light guide according to some embodiments. The connecting projection portion of the light guide can take various shapes. FIGS. 9A to 11C each illustrate a section of the light guide along a plane orthogonal to its extending direction. Hereinafter, various examples of the light guide according to some embodiments will be described with the descriptions centered on the configurations that differ from those of the foregoing embodiment. Configurations that are common among the embodiments are described briefly, or such descriptions will be omitted.

As illustrated in FIGS. 9A to 9D, in a light guide 312 according to an embodiment as well, a rod-shaped light guide portion 320 is connected to a side surface of the plate-shaped portion 118 by a connecting projection portion 322. The connecting projection portion 322 includes a bonding surface 322a bonded to the side surface of the plate-shaped portion 118 and two projection portion side surfaces 322b and 322c disposed at respective sides of the bonding surface 322a and connecting the bonding surface 322a to a peripheral surface 320c of the rod-shaped light guide portion 320. One or both of the two projection portion side surfaces 322b and 322c are flush with one or both of the principal surfaces 118a and 118b of the plate-shaped portion 118. A section of a rod-shaped portion 316 along a plane orthogonal to its extending direction has a shape obtained by combining a circular region and a rectangular region. The circular region corresponds to the cross section of the rod-shaped light guide portion 320, and the rectangular region corresponds to the cross section of the connecting projection portion 322. The rectangular region is adjacent to and is coupled to the circular region. In the light guide 312 according to an embodiment illustrated in FIGS. 9A to 9D as well, the possibility of problems such as an overlap and a crack that could arise in a multi-color molding process can be reduced.

Figure 9A:
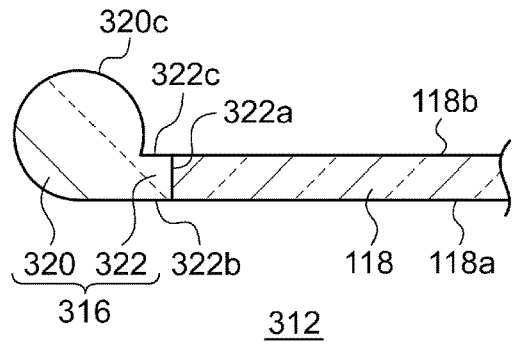
FIGS. 9A to 9D illustrate various other examples of the light guide according to an embodiment.

As illustrated in FIG. 9A, one projection portion side surface 322b of the two projection portion side surfaces 322b and 322c is tangent to the peripheral surface 320c of the rod-shaped light guide portion 320. In a case in which the rod-shaped light guide portion 320 extends linearly, the projection portion side surface 322b serves as a planar surface tangent to the peripheral surface 320c of the rod-shaped light guide portion 320. In a case in which the rod-shaped light guide portion 320 extends in a curve, the projection portion side surface 322b serves as a curved surface tangent to the peripheral surface 320c of the rod-shaped light guide portion 320. In the section of the light guide 312 along a plane orthogonal to its extending direction, the peripheral surface 320c of the rod-shaped light guide portion 320 forms an arc-shaped outline, and thus the projection portion side surface 322b is a tangent to this arc-shaped outline. The projection portion side surface 322c on the opposite side is connected to the peripheral surface 320c of the rod-shaped light guide portion 320 at a right angle or at any other angle.

In this manner, the projection portion side surface 322b of the connecting projection portion 322 forms a planar surface with the peripheral surface 320c of the rod-shaped light guide portion 320. No step is present between the projection portion side surface 322b and the peripheral surface 320c of the rod-shaped light guide portion 320. The stated planar surface can be used as a surface against which an ejector pin of a die is abutted when the light guide 312 is released from the die in the molding process. With the light guide 312 according to an embodiment illustrated in FIG. 9A, a broader abutting surface can be secured for the ejector pin, and an influence of impact from the abutment can be reduced, as compared to the light guide 112 illustrated in FIG. 4B. The possibility of a crack being produced in the bonding surface 322a can be reduced. In addition, as compared to the light guide 112, with the light guide 312, an overlap is more easily suppressed as the rod-shaped portion 316 is held more firmly in the die and the rotation of the rod-shaped portion 316 in the die is prevented in the molding process.

Figure 9B:
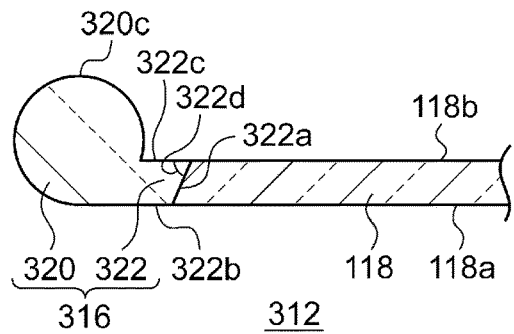

As illustrated in FIG. 9B, the bonding surface 322a may be inclined relative to the projection portion side surfaces 322b and 322c. This inclination makes it possible to secure a broader area for the bonding surface 322a, as compared to the case in which the bonding surface 322a is orthogonal to the projection portion side surfaces 322b and 322c. The enlargement of the bonding area makes it possible to improve the bonding strength between the rod-shaped portion 316 and the plate-shaped portion 118. From the viewpoint of improving the bonding strength, an angle of inclination 322d may be any desired angle, may be, for example, less than 90 degrees, or may be, for example, in a range of from 45 degrees to 89 degrees. The improvement in the bonding strength makes it possible to reduce the possibility of a crack being produced in the bonding surface 322a.

The bonding surface 322a is inclined to form an obtuse angle with the projection portion side surface 322b (i.e., an abutting surface for an ejector pin) that is tangent to the peripheral surface 320c of the rod-shaped light guide portion 320 and to form an acute angle with the projection portion side surface 322c on the opposite side. Such an inclination can make it easier to release the rod-shaped portion 316 from the die. From the viewpoint of releasability, the angle of inclination 322d may be slightly off 90 degrees and may be, for example, less than 90 degrees or in a range of from 85 degrees to 89 degrees.

From the viewpoint of improving the bonding strength, the inclination may be in any direction, and the bonding surface 322a may be inclined in the direction opposite to that illustrated in FIG. 9B, or in other words, inclined to form an acute angle with the projection portion side surface 322b and to form an obtuse angle with the projection portion side surface 322c on the opposite side.

Figure 9C:
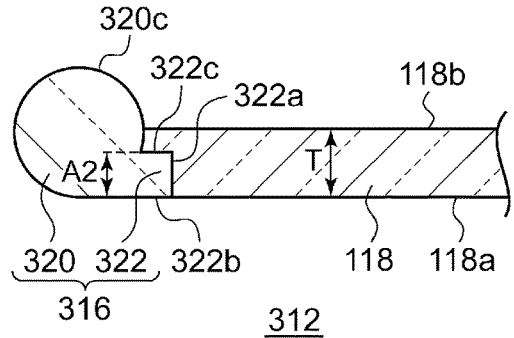

As illustrated in FIG. 9C, one projection portion side surface 322b of the two projection portion side surfaces 322b and 322c may be flush with one principal surface 118a of the two principal surfaces 118a and 118b of the plate-shaped portion 118, and the projection portion side surface 322c on the opposite side need not be flush with the principal surface 118b on the opposite side. The base thickness T of the plate-shaped portion 118 is greater than the width A2 of the connecting projection portion 322, and the plate-shaped portion 118 covers the projection portion side surface 322c of the connecting projection portion 322 to be bonded to the peripheral surface 320c of the rod-shaped light guide portion 320. In this manner, the light guide 312 may have such a bonded shape that is obtained by stacking the plate-shaped portion 118 on the connecting projection portion 322. The rod-shaped portion 316 and the plate-shaped portion 118 can be bonded at not only the bonding surface 322a but also a portion of the peripheral surface 320c and the projection portion side surface 322c. Thus, the bonding area can be increased, and the bonding strength between the rod-shaped portion 316 and the plate-shaped portion 118 can be improved. The improvement in the bonding strength makes it possible to reduce the possibility of a crack being produced in the bonding surface 322a.

Figure 9D:
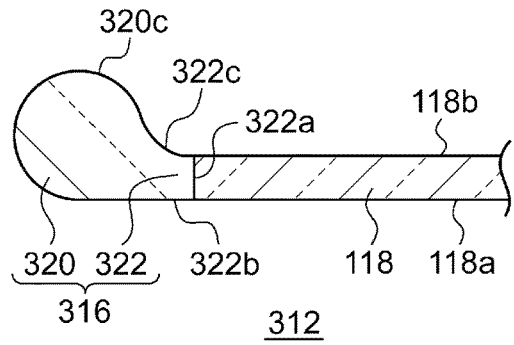

As illustrated in FIG. 9D, the two projection portion side surfaces 322b and 322c may both be tangent to the peripheral surface 320c of the rod-shaped light guide portion 320. In a section of the light guide 312 along a plane orthogonal to its extending direction, not only the projection portion side surface 322b but also the projection portion side surface 322c on the opposite side may be a tangent to the peripheral surface 320c.

As illustrated in FIGS. 10A to 10D, in a light guide 412 according to an embodiment as well, a rod-shaped light guide portion 420 is connected to a side surface of the plate-shaped portion 118 by a connecting projection portion 422. The connecting projection portion 422 includes a bonding surface 422a bonded to the side surface of the plate-shaped portion 118 and two projection portion side surfaces 422b and 422c disposed at respective sides of the bonding surface 422a and connecting the bonding surface 422a to a peripheral surface 420c of the rod-shaped light guide portion 420. A section of a rod-shaped portion 416 along a plane orthogonal to its extending direction has a shape obtained by combining a circular region and a rectangular region. The circular region corresponds to the cross section of the rod-shaped light guide portion 420, and the rectangular region corresponds to the cross section of the connecting projection portion 422. The rectangular region is adjacent to and is coupled to the circular region. In the light guide 412 according to an embodiment illustrated in FIGS. 10A to 10D as well, the possibility of problems such as an overlap and a crack that could arise in a multi-color molding process can be reduced.

Figure 10A:
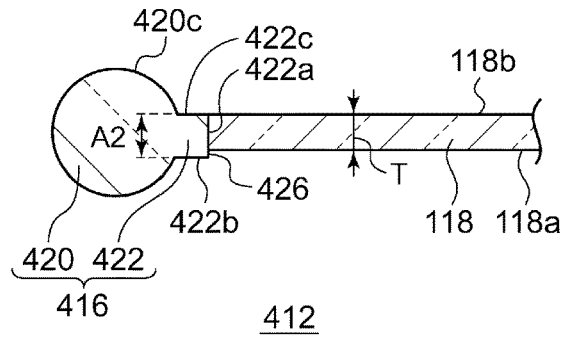
FIGS. 10A to 10D illustrate various other examples of the light guide according to an embodiment.

As illustrated in FIG. 10A, the width A2 of the bonding surface 422a from one of the two projection portion side surfaces 422b and 422c to the other one of the two projection portion side surfaces 422b and 422c is greater by design than the base thickness T of the plate-shaped portion 118. One projection portion side surface 422c of the two projection portion side surfaces 422b and 422c is flush with one principal surface 118b of the two principal surfaces 118a and 118b of the plate-shaped portion 118. Therefore, a step 426 is provided between the other projection portion side surface 422b and the principal surface 118a. This configuration provides an advantage in suppressing an overlap. Even if the rod-shaped portion 416, serving as a primary molded product, slightly shrinks upon being cooled, the width A2 of the bonding surface 422a is greater by design than the base thickness T of the plate-shaped portion 118, and thus an overflow of molten resin for forming the plate-shaped portion 118 from the bonding surface 422a can be suppressed.

Figure 10B:
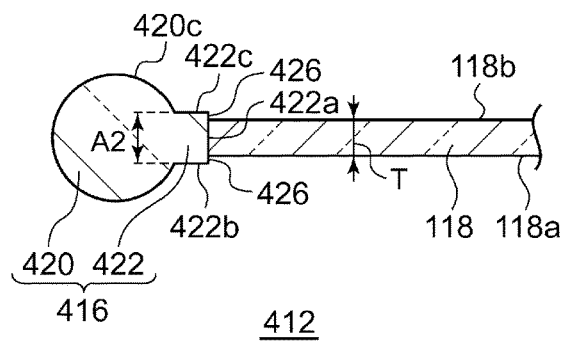

Similarly to FIG. 10A, in FIG. 10B, the width A2 of the bonding surface 422a from one of the two projection portion side surfaces 422b and 422c to the other one of the two projection portion side surfaces 422b and 422c is greater by design than the base thickness T of the plate-shaped portion 118. The projection portion side surfaces 422b and 422c are not flush with the principal surfaces 118a and 118b. Steps 426 are provided between the projection portion side surfaces 422b and 422c and the respective principal surfaces 118a and 118b. This configuration also makes it possible to suppress an overlap.

Figure 10C:
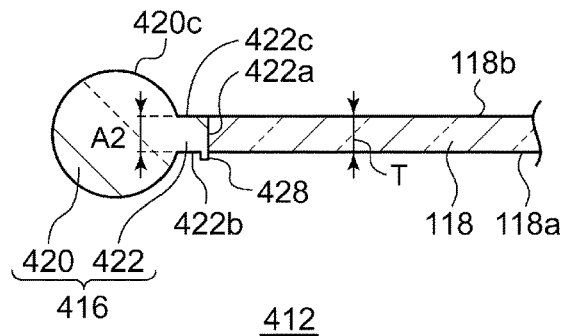

As illustrated in FIG. 10C, one projection portion side surface 422b of the two projection portion side surfaces 422b and 422c may be provided with a shelf portion 428. The shelf portion 428 is provided to make the width A2 of the bonding surface 422a greater than the base thickness T of the plate-shaped portion 118. This configuration also makes it possible to suppress an overlap. The shelf portion 428 may instead be provided on the projection portion side surface 422c on the opposite side or may be provided on each of the projection portion side surfaces 422b and 422c.

Figure 10D:
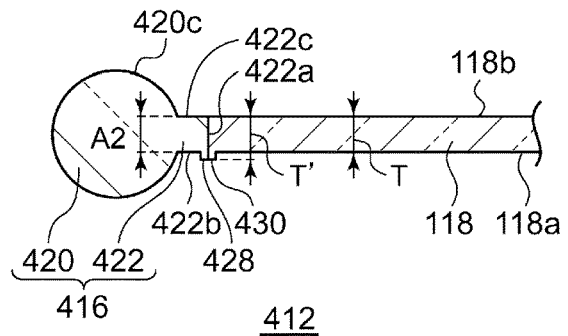

As illustrated in FIG. 10D, not only be the shelf portion 428 provided on the connecting projection portion 422, but a shelf portion 430 may also be provided on the plate-shaped portion 118. Providing the shelf portion 430 on the plate-shaped portion 118 makes it possible to match a width T' of the side surface of the plate-shaped portion 118 connected to the connecting projection portion 422 with the width A2 of the bonding surface 422a. Providing the shelf portions 428 and 430, respectively, on the connecting projection portion 422 and the plate-shaped portion 118 results in an increase in the bonding area and makes it possible to improve the bonding strength between the rod-shaped portion 416 and the plate-shaped portion 118. The improvement in the bonding strength makes it possible to reduce the possibility of a crack being produced in the bonding surface 422a.

Figure 11A:
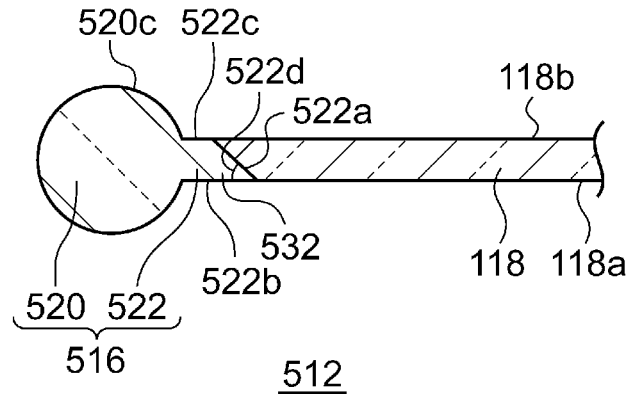
FIGS. 11A to 11C illustrate various other examples of the light guide according to an embodiment.
Figure 11B:
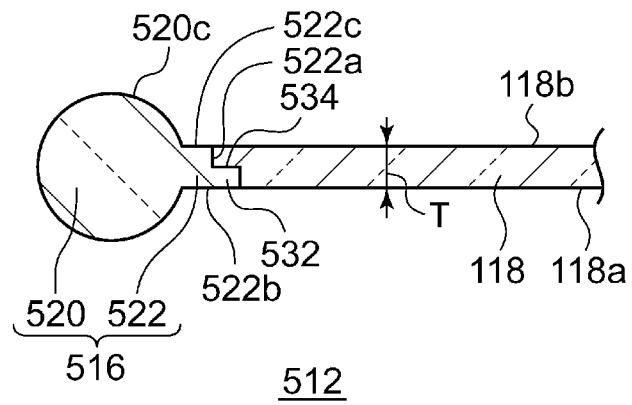
Figure 11C:
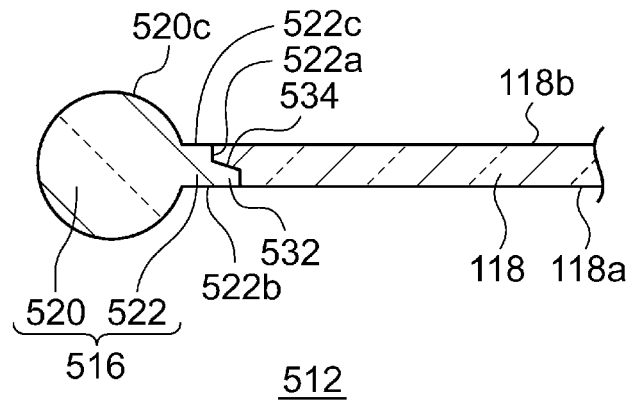

As illustrated in FIGS. 11A to 11C, in a light guide 512 according to an embodiment as well, a rod-shaped light guide portion 520 is connected to a side surface of the plate-shaped portion 118 by a connecting projection portion 522. The connecting projection portion 522 includes a bonding surface 522a bonded to the side surface of the plate-shaped portion 118 and two projection portion side surfaces 522b and 522c disposed at respective sides of the bonding surface 522a and connecting the bonding surface 522a to a peripheral surface 520c of the rod-shaped light guide portion 520. One or both of the two projection portion side surfaces 522b and 522c are flush with one or both of the two principal surfaces 118a and 118b of the plate-shaped portion 118. In the light guide 512 according to an embodiment illustrated in FIGS. 11A to 11C as well, the possibility of problems such as an overlap and a crack that could arise in a multi-color molding process can be reduced.

In the light guide 512 according to an embodiment illustrated in FIGS. 11A to 11C, a section of a rod-shaped portion 516 along a plane orthogonal to its extending direction has a shape obtained by combining a circular region and a rectangular region. The circular region corresponds to the cross section of the rod-shaped light guide portion 520, and the rectangular region corresponds to the cross section of the connecting projection portion 522. The rectangular region is adjacent to and is coupled to the circular region. The connecting projection portion 522 partially projects into the side surface of the plate-shaped portion 118. Accordingly, the rectangular region corresponding to the connecting projection portion 522 has such a shape that partially projects toward the side surface of the plate-shaped portion 118.

As illustrated in FIG. 11A, a projection portion 532 that projects toward the side surface of the plate-shaped portion 118 is formed at the bonding surface 522a, and the bonding surface 522a is inclined relative to the projection portion side surfaces 522b and 522c. The side surface of the plate-shaped portion 118 is also inclined in accordance with the inclination of the bonding surface 522a. The projection portion 532 is formed on the side of the one projection portion side surface 522b, but instead thereof, the projection portion 532 may be formed on the side of the other projection portion side surface 522c. Such an inclination makes it possible to secure a broader area for the bonding surface 522a, as compared to the case in which the bonding surface 522a is orthogonal to the projection portion side surfaces 522b and 522c. The enlargement of the bonding area makes it possible to improve the bonding strength between the rod-shaped portion 516 and the plate-shaped portion 118. From the viewpoint of improving the bonding strength, an angle of inclination 522d of the projection portion 532 may be any desired angle and may be, for example, in a range of from 1 degree to 45 degrees. The improvement in the bonding strength makes it possible to reduce the possibility of a crack being produced in the bonding surface 522a.

As illustrated in FIG. 11B, the projection portion 532 on the bonding surface 522a forms a step 534 in the bonding surface 522a. In one example, the step 534 is formed at an intermediate position, or in other words, formed at a position that is one half the base thickness T of the plate-shaped portion 118. A step is also formed in the side surface of the plate-shaped portion 118 in accordance with the step 534, and these steps engage with each other. In this manner as well, the bonding strength between the rod-shaped portion 516 and the plate-shaped portion 118 is improved, and the possibility of a crack being produced in the bonding surface 522a can be reduced.

As illustrated in FIG. 11C, the step 534 formed in the bonding surface 522a by the projection portion 532 may be inclined. Such an inclination or a gradually varying step helps alleviate the stress concentration at the bonding surface 522a. The projection portion 532 makes it possible to improve the bonding strength between the rod-shaped portion 516 and the plate-shaped portion 118.

The present invention is not limited to the foregoing embodiments and modifications. The embodiments and the modifications can be combined, or further modifications, including various design changes, can be made to the foregoing embodiments and modifications on the basis of the knowledge of a person skilled in the art. An embodiment or a modification obtained through such combinations or by making further modifications is also encompassed by the scope of the present invention. The foregoing embodiments and modifications and a new embodiment obtained by combining the foregoing embodiments and modifications with the following modifications have advantageous effects of each of the combined embodiments, modifications, and further modifications.

The rod-shaped light guide portion 120 is connected to the side surface 118c of the plate-shaped portion 118 by the connecting projection portion 122 in the foregoing embodiment, but this is not a limiting example. The rod-shaped light guide portion 120 may be connected to any one of the other side surfaces 118d, 118e, and 118f of the plate-shaped portion 118 by the connecting projection portion 122. In addition, the light guide 112 may include a plurality of rod-shaped portions 116. Each rod-shaped portion 116 may include the rod-shaped light guide portion 120 and the connecting projection portion 122. In this case, a rod-shaped light guide portion of a first rod-shaped portion may be connected to a first side surface of a plate-shaped portion by a connecting projection portion, and a rod-shaped light guide portion of a second rod-shaped portion may be connected to a second side surface of the plate-shaped portion by a connecting projection portion. The first side surface and the second side surface may face opposite to each other.

In the foregoing embodiments, a rear combination lamp has been illustrated as an example of the vehicle lamp. However, the vehicle lamp is not limited to a specific type or use, and the present invention can be widely applied to various types of vehicle lamps, including a turn signal lamp, a stop lamp, a clearance lamp, a daytime running lamp, a cornering lamp, a hazard warning lamp, a position lamp, a backup lamp, a fog lamp, and a head lamp.

What is claimed is:

1. A light guide, comprising:
a rod-shaped portion; and
a plate-shaped portion, wherein
the rod-shaped portion includes
a rod-shaped light guide portion, and
a connecting projection portion projecting from a peripheral surface of the rod-shaped light guide portion and extending along the rod-shaped light guide portion, and
the plate-shaped portion includes
two principal surfaces facing opposite to each other, and
a plate-shaped portion side surface connecting the two principal surfaces,
the light guide being a multi-color molded product in which the rod-shaped light guide portion is formed of a first resin material, the connecting projection portion is formed of the first resin material and the plate-shaped portion is formed of a second resin material containing a light diffusing agent,
the first resin material contains the light diffusing agent at a concentration lower than that in the second resin material or contains no light diffusing agent,
the rod-shaped light guide portion being connected to the plate-shaped portion side surface by the connecting projection portion.

2. The light guide according to claim 1, wherein
the connecting projection portion includes a bonding surface bonded to the plate-shaped portion side surface.

3. The light guide according to claim 2, wherein the connecting projection portion includes two projection portion side surfaces disposed at respective sides of the bonding surface and connecting the bonding surface to the peripheral surface of the rod-shaped light guide portion.

4. The light guide according to claim 3, wherein one of the two projection portion side surfaces is flush with one of the two principal surfaces of the plate-shaped portion.

5. The light guide according to claim 3, wherein the two projection portion side surfaces are flush with the respective principal surfaces of the plate-shaped portion.

6. The light guide according to claim 3, wherein the bonding surface is inclined relative to the projection portion side surfaces.

7. The light guide according to claim 3, wherein the plate-shaped portion has a base thickness greater than a width of the bonding surface, the width being a distance between the two projection portion side surfaces, and the connecting projection portion and a portion of the peripheral surface of the rod-shaped light guide portion are bonded to the plate-shaped portion side surface.

8. The light guide according to claim 3, wherein at least one of the two projection portion side surfaces is tangent to the peripheral surface of the rod-shaped light guide portion.

9. The light guide according to claim 8, wherein one of the two projection portion side surfaces is tangent to the peripheral surface of the rod-shaped light guide portion, and the bonding surface forms an obtuse angle with the one of the projection portion side surfaces that is tangent to the peripheral surface of the rod-shaped light guide portion and forms an acute angle with the other one of the projection portion side surfaces.

10. The light guide according to claim 3, wherein a width of the bonding surface is greater than a base thickness of the plate-shaped portion, the width being a distance between the two projection portion side surfaces.

11. The light guide according to claim 10, wherein at least one of the projection portion side surfaces includes a shelf portion bonded to the plate-shaped portion side surface.

12. The light guide according to claim 11, wherein another shelf portion is provided on the plate-shaped portion side surface.

13. The light guide according to claim 1, wherein the connecting projection portion partially projects into the plate-shaped portion side surface.

14. The light guide according to claim 13, wherein the connecting projection portion includes a bonding surface bonded to the plate-shaped portion side surface, the bonding surface includes a step, and the plate-shaped portion side surface includes a step that engages with the step in the bonding surface.

15. The light guide according to claim 1, wherein the rod-shaped light guide portion and the connecting projection portion are an integrally molded piece.

16. The light guide according to claim 1, wherein the rod-shaped light guide portion is curved.

17. The light guide according to claim 1, wherein the first resin material and the second resin material have a common optical property.

18. The light guide according to claim 1, wherein the light guide includes neither an optical step nor a reflective element.

19. A vehicle lamp, comprising: the light guide according to claim 1; and a light source, wherein the light source is configured to emit light, the light entering the rod-shaped light guide portion through a light-incident surface of the rod-shaped light guide portion, entering the plate-shaped portion from the rod-shaped light guide portion through the connecting projection portion, and being emitted through the principal surfaces of the plate-shaped portion by the light diffusing agent.

* * * * *